United States Patent

[11] 3,603,737

[72] Inventors Maurice F. Le Dorh
34 rue Branly, Perros-Guirec;
Yves H. Le Goffic, Pavillon no. 3 Saint Roch, Lannion; Fernand R. Arnouat, Pen an Rue, Lannion, all of, France

[21] Appl. No. 857,687
[22] Filed Sept. 15, 1969
[45] Patented Sept. 7, 1971
[32] Priority Sept. 13, 1968, Jan. 24, 1969
[33] France
[31] 166,157 and 69 01448

[54] CALL SYSTEM FOR TIME-DIVISION, DELTA-CODE SWITCHING NETWORK
3 Claims, 12 Drawing Figs.

[52] U.S. Cl. ........ 179/15 AP, 179/15 BY, 179/18 J,
[51] Int. Cl. ........ H04j 3/12
[50] Field of Search ........ 179/15 AP, 15 BY, 18 J

[56] References Cited
UNITED STATES PATENTS
3,223,784 12/1965 Inose et al. ........ 179/18 J X

*Primary Examiner*—Kathleen H. Claffy
*Assistant Examiner*—Thomas W. Brown
*Attorney*—Abraham A. Saffitz

ABSTRACT: Call system for time-division Δ-code switching system in which the telephone sets comprise a Δ-modem and a keyboard arrangement sending the call numbers expressed in a binary code. The call number comprises a variable call pulse combination, two fixed pulse combinations framing the pulse code combination and a predetermined number of bits of the same value forming a group preceding the call pulse combination and identifying it. As the bits the call pulse and framing pulse combinations and the bits of the identifying group on the one hand have the same frequency as the Δ-code pulses generated by the Δ-modem on the other hand, means must be provided for separating them. In the switching network a counter counts the digits of the identifying group and controls a switching circuit which directs towards two separate ways the Δ-code pulses and the bits of the call number.

PATENTED SEP 7 1971 3,603,737

INVENTORS:
M. F. LE DORH,
Y. H. LE GOFFIC, F. R. ARNOUAT
By: Abraham A. Saffitz
ATTORNEY

PATENTED SEP 7 1971 3,603,737

SHEET 2 OF 9

INVENTORS:
M. F. LE DORH,
Y. H. LE GOFFIC, F. R. ARNOUAT
By: Abraham A. Saffitz
ATTORNEY INVENTORS:
M. F. LE DORH,
Y. H. LE GOFFIC, F. R. ARNOUAT
By: Abraham A. Saffitz
ATTORNEY

INVENTORS:

M. F. LE DORH,
Y. H. LE GOFFIC, F. R. ARNOUAT

By: Abraham A. Saffitz
ATTORNEY

INVENTORS:
M. F. LE DORH,
Y. H. LE GOFFIC, F. R. ARNOUAT
By: Abraham A. Saffitz
ATTORNEY INVENTORS:
M. F. LE DORH,
Y. H. LE GOFFIC, F. R. ARNOUAT
By: Abraham A. Soffitz
ATTORNEY INVENTORS:
M. F. LE DORH,
Y. H. LE GOFFIC, F. R. ARNOUAT
By; Abraham A. Saffitz
ATTORNEY INVENTORS:
M. F. LE DORH,
Y. H. LE GOFFIC, F. R. ARNOUAT
By: Abraham A. Saffitz
ATTORNEY INVENTORS:
Maurice F. LE DORH,
Yves H. LE GOFFIC,
Fernand R. ARNOUAT
By Abraham A. Saffitz
ATTORNEY

CALL SYSTEM FOR TIME-DIVISION, DELTA-CODE SWITCHING NETWORK

The invention relates to a system for making telephone calls in which the telephone sets have a numbering keyboard and transmit and receive directly the information in Δ-code form and make the conversion to analog.

In such a call system, each figure of a directory number is coded in the set of the subscriber when the same dials the call number of his correspondent by actuating the keys of the set. The use of the keyboard with 10 keys in which each key has a number of the series from 0 to 9 facilitates the dialing of the called number as compared to the use of a dial proper and also permits traffic to be accelerated. As a matter of fact, the time for establishing a connection should be reduced as far as possible and in consequence the time used by a subscriber to dial a number becomes an important factor.

Regarding telephone sets working in Δ-code, reference may be made for example to U.S. Pat. application Ser. No. 834,798 filed on June 19, 1969, by the applicants, now issued as U.S. Pat. No. 3,578,915, granted May 18, 1971 entitled "System for telephone switching with time division and Δ modulation." In this patent application, subscribers' telephone sets are described in which the audiofrequency analog signals, coming from the calling subscriber's microphone, are immediately coded according to a Δ code and in which the signals received from the called subscriber in a Δ code are decoded from this code into analog signals by Δ-coders-decoders fitted into the set of the subscriber.

It is known that, in certain existing telephone sets where the speech signals are conventional analog signals, the call device is a keyboard instead of a dial, actuation of the keys giving rise to combinations of sinusoidal signals of different frequencies in the audio band which represent the call digits. It would seem therefore of advantage to use, in telephone sets operating in Δ modulation, the Δ coder and decoder for treating the sinusoidal call signals in the same way as the speech signals are treated because these two kinds of signals, call and speech, belong to the audiofrequency band. Such a system would require the telephone set to be equipped with audiofrequency signal generators associated with filtering networks; this is not desirable because this equipment, even if miniaturized, would render the set more bulky and would also substantially increase its price. Moreover, this system requires decoders and filtering networks in the exchange.

The object of the invention is a call system with keyboard independent of the Δ modulation and demodulation members of the telephone set, in which each decimal digit of a call number is converted directly into a binary number by actuating the corresponding key of a keyboard. This call system requires only the addition of integrated circuits of small dimensions and of low power consumption in the telephone set of the subscriber.

Regarding the switching network in the exchange, this must obviously be connected to equipment suitable for the calling system in question, which will be described in detail in the following.

In order to facilitate the description, we shall consider, by way of example, the simple case in which a call number comprises only two decimal digits wherein each decimal digit is represented in binary form by a four bit code *a*, *b*, *c*, *d*.

In the invention call system, the call signals and the speech signals are composed of pulses of identical waveform although respectively pertaining to a binary code and to a Δ code. Means must be provided to discriminate these signals. In order to distinguish the call signals from the Δ-coded speech signals, each combination *a*, *b*, *c*, *d*, of the call code is preceded and followed by four invariable bits *a'*, *b'*, *c'*, *d'* which form framing sequence but differ from those of the 10 combinations *a*, *b*, *c*, *d* respectively allotted to the digits 0 to 9. Moreover, any transmission of a call number combination is preceded by a comparatively long absence of line signal, for example, 10 milliseconds.

In the exchange, the device receiving the numbering is not available for a signal from the subscriber's set unless the same receives an invitation to dial. The device for detecting the call digits comprises means for checking that each digit is preceded by a prolonged absence of signal and is framed between two framing sequences.

The invention will be further described, by way of example, with reference to the accompanying drawing, in which:

FIG. 1 shows a subscriber's telephone set 1 of a subscriber comprising, on one hand, a coder-decoder unit converting an analog signal into a Δ-code signal and a Δ-code signal into an analog signal, and, on the other hand, the call unit according to the invention.

Figure 1:
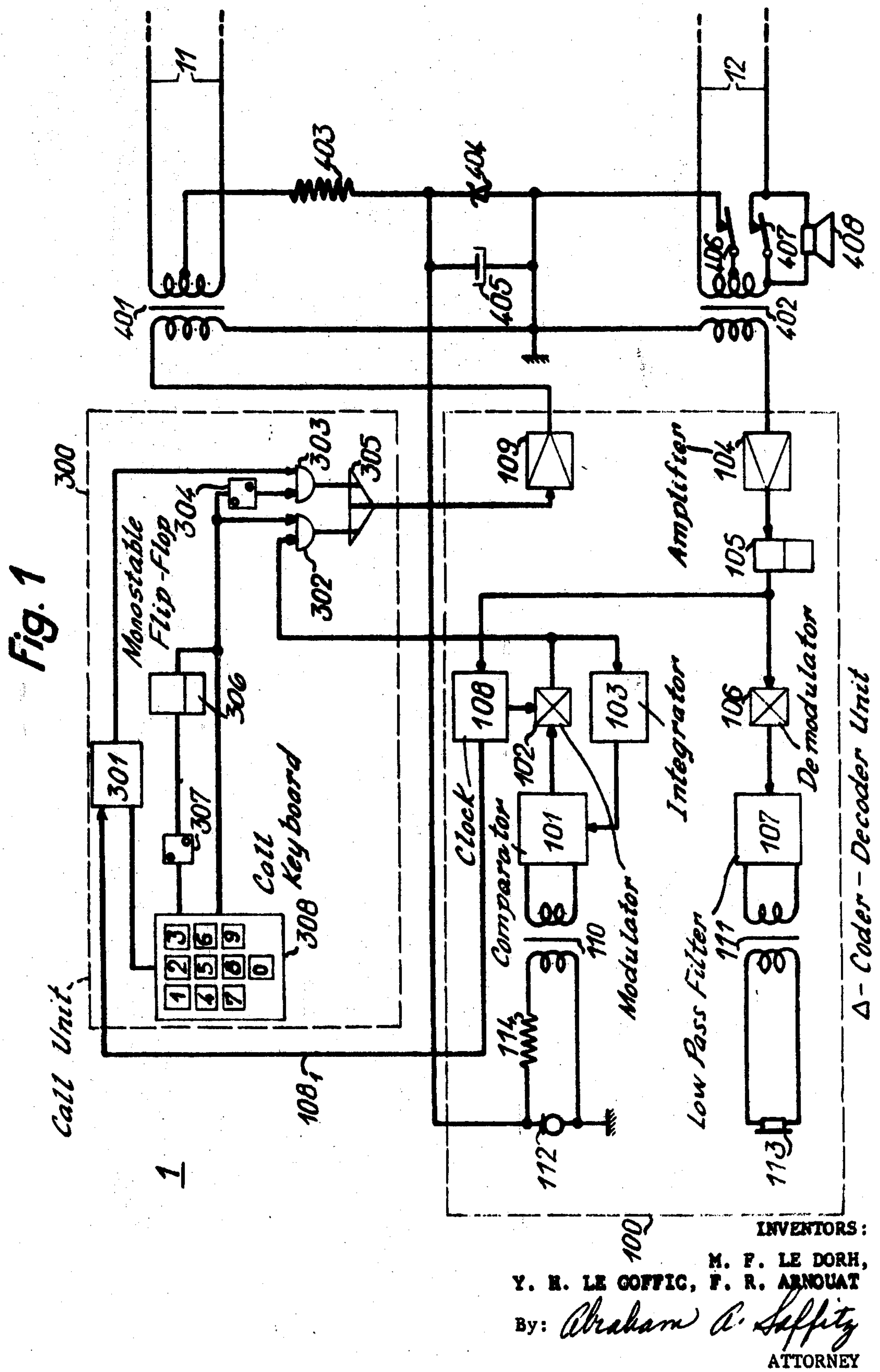
FIG. 1 shows the internal equipment of the telephone set adapted to produce binary code call signals and to transmit and receive Δ-code speech signals.

In FIG. 1, reference numeral 100 indicates the Δ-coder-decoder unit, 300 is the keyboard call unit and 401 and 402 are two matching and separating transformers, connected, respectively, to the four-wire telephone line 11 and 12, which connects the telephone set with its exchange.

The secondary transformer windings 401 and 402 have a center point. The phantom circuit of the two circuits 11, 12 is used for supplying the direct current of the battery of the exchange to the telephone set. This direct current supplies the microphone 112 and the other parts, such as amplifiers 104 and 109, when the handset is lifted (switch 406). The voltage of this direct current is controlled by the resistance 403 and the Zener diode 404 shunted by the capacitor 405.

The transformer 401 transmits to the line 11 the coded call and speech signals from the set 1. The transformer 402 transmits to the telephone set 1 through the line 12 the coded speech currents from the subscriber asking for this set, as well as the call currents produced by a call generator arranged in the exchange and actuated by the call signals transmitted from the calling subscriber's set. These call currents actuate the bell arrangement 408. This is then short-circuited by the switch 407, when the called subscriber lifts his handset (this position is shown in FIG. 1).

As will be shown later, the functioning of units 100 and 300 is independent one from the other. They are switched to the outgoing line 11 at the suitable times by AND gates 302, 303 and OR gate 305.

When, in order to make a call, the subscriber of the set 1 lifts his handset, the coder-decoder unit 100 is disengaged by the closure of the AND gate 302, produced by the actuation of the keys of the keyboard 308. On the other hand, the AND gate 303 is open to pass the coded pulses produced by the actuation of the keyboard 308. These are applied within the unit 100 to the transmission amplifier 109 which transmits them to the exchange via the transformer 401 and the line 11. When the subscriber releases the key, the AND gate 303 is again closed and the AND gate 302 is opened; the amplifier 109 is again connected to the unit 100.

In order to explain better the invention, the following describes the operation of the Δ-coder-decoder unit 100, although it has already been described in applicants' U.S. patent referred to above.

The analog signals at voice frequencies produced by the microphone 112, are applied to the input of the comparator 101, connected to the modulator 102 which receives from the clock 108 a train of clock pulses of well defined periodicity. These pulses are modulated in 102 by signals coming from the comparator 101. The modulator 102 delivers or not pulses cophasal with the clock pulses according to the result of the comparison between the analog signal and the quantified signal derived by the integrator 103 from the pulses coming from the modulator 102, and made in the comparator 101. These are transmitted to the exchange by the line 11 via the amplifier 109.

The reception line 12 transmits to the set the train of coded pulses derived from the analog speech signals between the caller and the subscriber of set 1. This train, which has suffered a certain amount of distortion, is shaped by the threshold amplifier 104 followed by a monostable flip-flop 105. The signal coming from the flip-flop 105 is directed towards the demodulator 106 which has a structure similar to that of the integrator 103 and towards the clock 108, in order to synchronize it.

The output of the demodulator 106 supplies a quantified signal which is smoothed in the low pass filter 107. The output of the filter 107 yields therefore an analog signal at voice frequencies which actuates the earphone 113.

Figure 2:
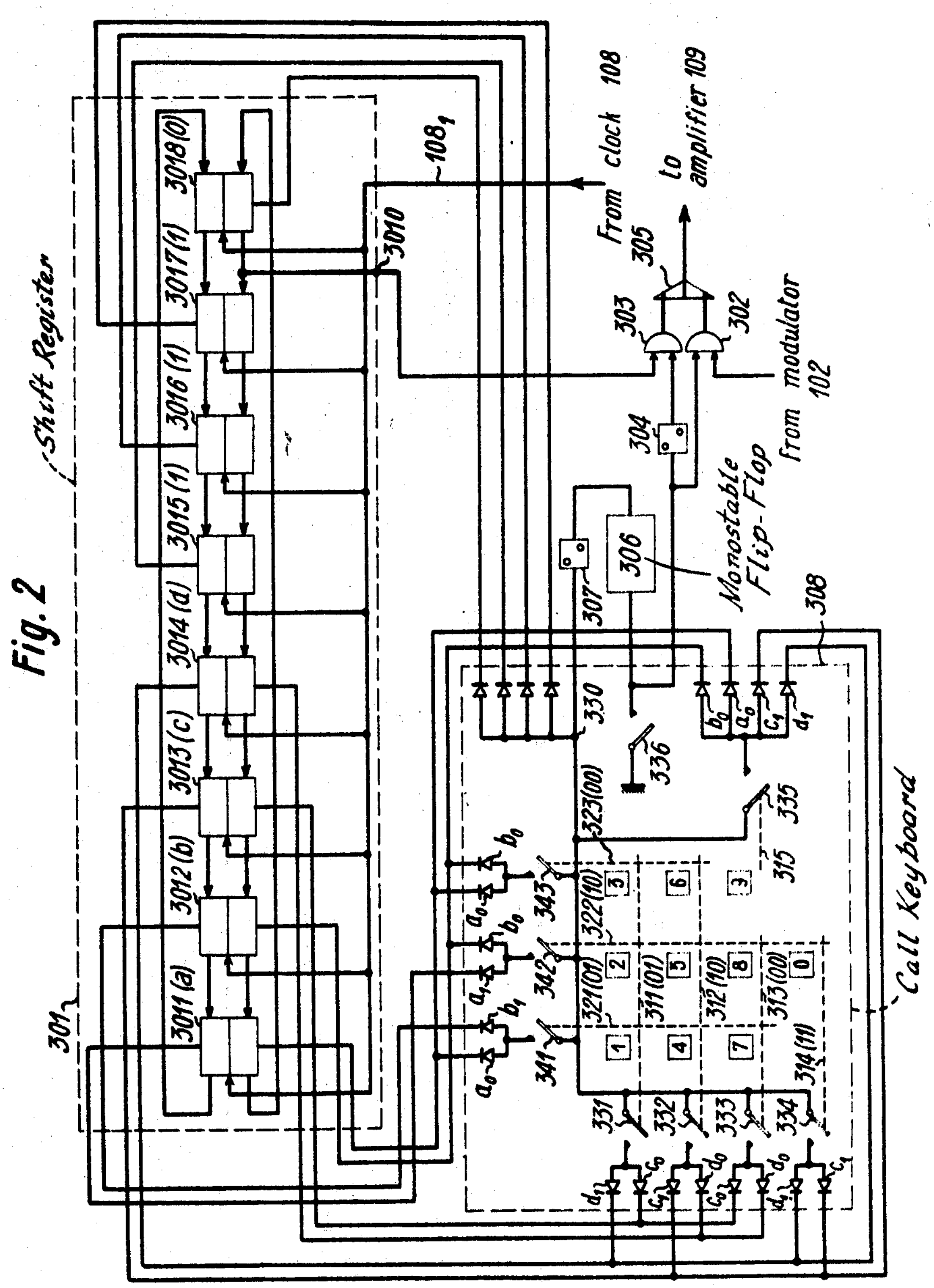
FIG. 2 is a detailed diagram of the call unit in the telephone set.

FIG. 2 is a detailed diagram of the call unit 300.

In this figure, reference numeral 308 indicates the call keyboard. Regarding the mechanical part of this keyboard, this does not differ from keyboards known in the art; i.e., the digits 1 to 3, 4 to 6, 7 to 9 are arranged in three rows, with the 0 aside, and in that the depression of one key causes, in the majority of keys, the movement of two bars, one horizontal and one vertical bar, which actuate, respectively, two switches ensuring the correct connections for the production of suitably coded call signals. For example, the depression of the key marked 1 causes the closure of the switch 331 connected to the horizontal bar 311 and the closure of the switch 341, connected to the vertical bar 321.

For example, if the keys of digits 1 or 2 or 3 are depressed, the switch 331 is closed; if the keys of digits 1 or 4 or 7 are depressed, the switch 341 is closed. Thus, the values of the digits 0 to 9 of the keyboard cannot be coded by translating them into their binary equivalents. But the values of the digits 0 to 9 can be coded by identifying each bar by two bits. For example, the bars are numbered as follows:

| | |
|---|---|
| 311→01 | 321→01 |
| 312→10 | 322→10 |
| 313→00 | 322→00 |
| 314→11 | |

In order to avoid having to use the combination 0000, the key 9 actuates only one horizontal bar 315, coded 0011. The coding is as follows:

| | | |
|---|---|---|
| 1→0101 | 2→1001 | 3→0001 |
| 4→0110 | 5→1010 | 6→0010 |
| 7→0100 | 8→1000 | 9→0011 |
| | 0→1011 | |

Finally, it should be noted that depression of any one of the keys of the keyboard actuates the main switch 336 one of the terminals of which is grounded. The function of this switch will be explained further below.

It is known that the use of 4 bits permits 16 combinations to be obtained. Of these, the keyboard 308 uses only 10, and a fixed sequence may be chosen amongst the remaining 6 for identifying a numbering function signal. In other words, each group of 4 bits designating a decimal digit of the keyboard 308 will be preceded and followed by a fixed sequence of 4 bits.

The code transmitted by line for each digit of the keyboard is therefore a cyclic sequence; assuming that 1110 has been chosen as fixed sequence, one obtains the following:

1 = 1 1 1 0 0 1 0 1 1 1 1 0 0 1 0 1 . . .
2 = 1 1 1 0 1 0 0 1 1 1 1 0 1 0 0 1 . . .
3 = 1 1 1 0 0 0 0 1 1 1 1 0 0 0 0 1 . . .
4 = 1 1 1 0 0 1 1 0 1 1 1 0 0 1 1 0 . . .
5 = 1 1 1 0 1 0 1 0 1 1 1 0 1 0 1 0 . . .
6 = 1 1 1 0 0 0 1 0 1 1 1 0 0 0 1 0 . . .
7 = 1 1 1 0 0 1 0 0 1 1 1 0 0 1 0 0 . . .
8 = 1 1 1 0 1 0 0 0 1 1 1 0 1 0 0 0 . . .
9 = 1 1 1 0 0 0 1 1 1 1 1 0 0 0 1 1 . . .
0 = 1 1 1 0 1 0 1 1 1 1 1 0 1 0 1 1 . . .

At the reception, if it is always the same word *a*, *b*, *c*, *d* which is framed by the fixed sequence 1 1 1 0, this word is a dialing combination coming from the keyboard 308. This check is possible only if the framing sequences do not form with the bits at the beginning or at the end of a dialing combination another framing sequence. If, for example, the fixed sequence consists of the 3 bits 101, this might lead to confusion between the sequence characterizing the digit 1 and that characterizing the digit 4.

By writing the sequences

1 = 101 / 0101 / 101 / 0101 / 101
4 = 1 / 0101 / 101 / 0101 / 101 / 01 it can be seen that they differ only in the first two binary digits 10 of the sequence corresponding to the decimal digit 1.

In order to eliminate this element of error, the framing sequence must comprise at least four digits.

The contacts made by the keys of the keyboard 308 are used to position a shift register 301 by means of diodes and an electrical positioning signal produced by the main switch 336 acting on the monostable flip-flop 306. To this end, all switches 331, 332, 333, 334, 335 of the horizontal bars and 341, 342, 343 of the vertical bars have one of their terminals connected by the same connection point 330. Since the shift register 301 must be filled in by four binary digits, each switch 331, 332, 333, 334, 341, 342, 343 connects the connection point 330 to two diodes. For the switch 335 which is associated with the digit 9, the connection 330 is connected to four diodes across this switch.

The shift register 301 comprises eight flip-flops, of which the first four 3011 to 3014 are adapted to write-in the digits *a*, *b*, *c*, *d*, representing a decimal digit of the call number, and the four last ones 3015 to 3018 for writing-in the framing combination 1 1 1 0.

The diodes $a_o$ are connected to the input 0 of the flip-flop 3011; the diodes $b_o$ are connected to the input 0 of the flip-flop 3012. The diode $a_1$ is connected to the input 1 of the flip-flop 3011. The diode $b_1$ is connected to the input 1 the flip-flop 3012. The diodes $c_o$ are connected to the input 0 of the flip-flop 3013. The diodes $d_o$ are connected to the input 0 of the flip-flop 3014. The diodes $c_1$ are connected to the input 1 of the flip-flop 3013 and the diodes $d_1$ are connected to the input 1 of the flip-flop 3014.

In this manner, the coding shown above can be readily realized.

The common connection point 330 to the switches 331 to 335 and 341 to 343 is connected through diodes with the inputs 1 of the flip-flops 3015, 3016, 3017 and with the input 0 of the flip-flop 3018.

The functioning of a dialing operation will now be explained.

For example, when the operator depresses the key associated with the digit 1 for a variable period, which will be in practice higher than 30 ms., the switches 331, 336, 341 are closed simultaneously. The contact made by the switch 336 actuates the monostable flip-flop 306 which blocks the register 301 for 10 milliseconds and positions the flip-flops of this register into the respective positions 0, 1, 0, 1, 1, 1, 1, 0, so that it transmits, after these 10 ms., the sequence of bits which characterizes the decimal digit 1 and the 4 fixed bits 1 1 1 0 of the framing sequence.

In order to obtain this result, the signal from the flip-flop 306 passes through an inverter 307 in connection with the common point 330 and is in this manner channelled by the switch 341 towards the input 0 of the flip-flop 3011 and the input 1 of the flip-flop 3012;

by the switch 331 towards the input 0 of the flip-flop 3013 and the input 1 of the flip-flop 3014;

towards the inputs 1 of the flip-flops 3015, 3016, 3017 and the input 0 of the flip-flop 3018.

During the duration of the signal transmitted by the monostable flip-flop 306, the output 3010 of the register 301 is in the zero state. From the end of this signal, if the key remains depressed, the register 301 starts under the action of the clock 108 (wire $108_1$), which is located in the Δ coder-docoder unit 100 (FIG. 1) of the telephone set 1 and which transmits a train of pulses at the frequency of 56 kHz.

The register 301, being looped back on itself, supplies the information which it has stored cyclically as long as the key 1 is depressed.

The contact made by the switch 336 permits not only the actuation of the flip-flop 306, but also the control of the AND gates 302, 303 (FIGS. 1 and 2).

The gate 302, which permits the Δ modulated speech signals to pass, is open at rest; on the other hand, the AND gate 303 which permits the passage of the coded call signals is closed.

When a key of the keyboard 308 is depressed, the contact of the switch 336 causes the AND gate 302 to close and the AND gate 303 to open by means of the inverter 304. The amplifier 109 may then be actuated by the coded call signals.

Finally, the transmission of a call signal is characterized by the deenergization of the Δ-coder-decoder unit 100; the absence of the call signal during 10 milliseconds caused by the flip-flop 306 and detected in the exchange to announce the arrival of a dialing digit; and by the transmission of the call signal corresponding to one digit of the call number for at least 20 milliseconds. Statistics show that one actuation of the keyboard causes a key to be depressed for at least 30 milliseconds. The duration of the transmission of a coded digit followed by the framing sequence (totaling eight binary digits) is about 140 microseconds. It can be seen that a coded digit is transmitted a large number of times.

Figure 3:
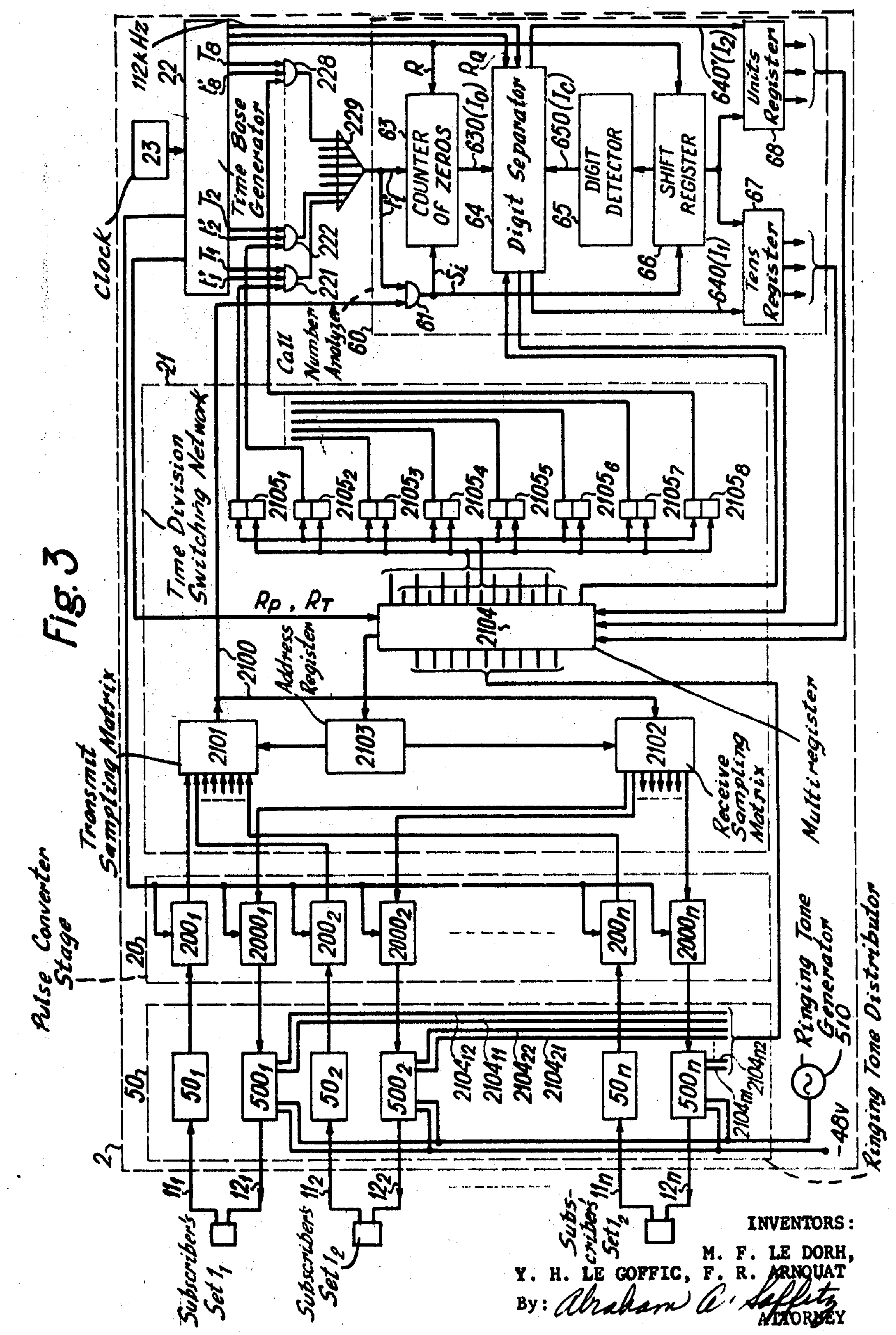
FIG. 3 is a block diagram of the telephone exchange, comprising particularly the units necessary for receiving and transmitting call signals.

FIG. 3 shows, in the form of a block diagram, the telephone exchange 2, described already in the applicants' previously cited patent but comprising additionally the units necessary for receiving and transmitting the call signals.

Regarding the switching of the Δ-coded speech signals, the telephone exchange 2 comprises a time-division switching network and the assembly of circuits 20 described in the prior patent above referred to and which form the subscribers' equipments.

The units $200_1$ to $200_n$ of this assembly 20 are pulse stretcher and pulse phase-shifter circuits attached respectively to the subscribers $1_1$ to $1_n$ of the exchange 2. They receive the Δ code pulses, convert them into longer pulses having instants of occurrence cophasal with the sampling periods of the switching network and then sample said stretched and phase-shifted pulses.

The units $2000_1$ to $2000_n$ are so-called "retransmission" circuits connected respectively to the subscribers $1_1$ to $1_n$ of the exchange 2. They retransmit without jitter the Δ-coded speech signals from the called subscriber to the calling subscriber.

The unit 20 and the switching network 21 are controlled by the clock 23 via the time base generator 22.

As far as the coded call signals are concerned, the circuits 20 and the switching network 21 are also used but two further units must be added, namely:

the unit 50, the "ringing tone distributor," which is governed by the switching network 21 and receives from the same the control signals after the identification of the called subscriber. These signals cause the actuation of relays which connect a call generator 510 to the line of the called subscriber. The unit 50 is also used for supplying the sets $1_1$ to $1_n$ with direct current.

the unit 60, the "call number analyzer,", which analyzes the coded call signals received by the switching network 21 to permit the same the suitable identification of the called subscribers.

Figure 4:
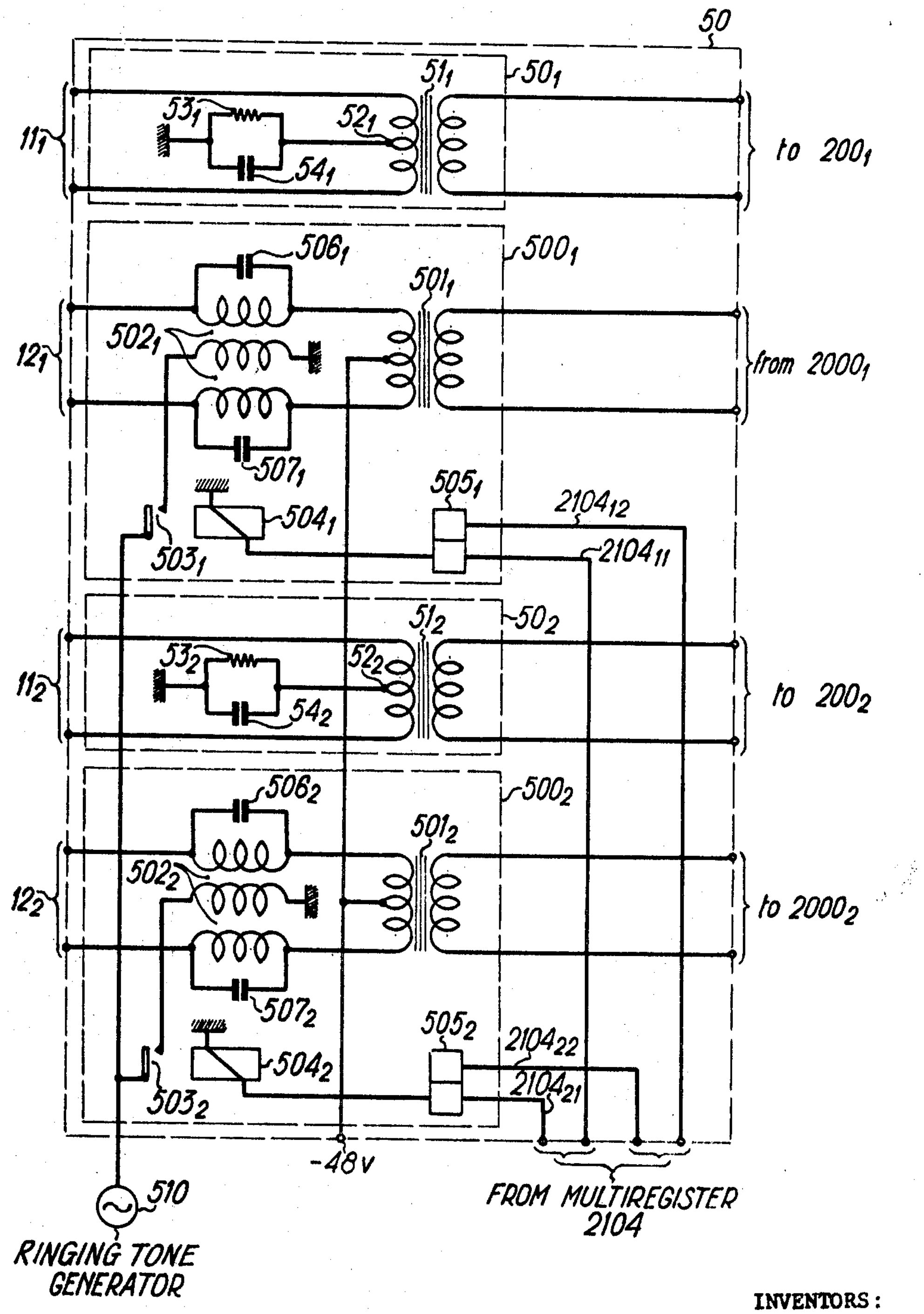
FIG. 4 shows the calls distributor at voice frequencies.

FIG. 4 shows the electric diagram of the ringing tone distributor 50 which comprises *n* identical circuits $50_1$ to $50_n$ whose input terminals are connected respectively to the transmission lines $11_1$ to $11_n$, and *n* identical units $500_1$ to $500_n$ whose output terminals are connected respectively to the receiving lines $12_1$ to $12_n$. In order to simplify the drawing, FIG. 4 shows only the units $50_1$, $50_2$, $500_1$ and $500_2$.

One unit such as $50_1$ consists of a transformer $51_1$ whose primary winding has a center point $52_1$ grounded through a resistor $53_1$, shunted by a capacitor $54_1$. The resistor $53_1$ permits the control of the direct current of the battery in the exchange which, as already mentioned, flows in the lines $11_1$ and $12_1$ mounted as a phantom circuit. The presence of the center point $52_1$ is also used for testing the loop of the subscriber's line.

A unit such as $500_1$ comprises a transformer $501_1$ having the same characteristics as the transformer $51_1$. Its secondary winding is in series with two secondary half-windings of a transformer $502_1$, the primary of which can be connected to a call generator 510 through a contact $503_1$ of a relay $504_1$. The half-windings of the transformer $502_1$ are tuned to the frequency of the call tone generator 510 by means of capacitors $506_1$ and $507_1$ which shunt them.

When a call order arrives from the multiregister 2104 of the switching network 21 over the wire $2104_{11}$, it actuates the flip-flop $505_1$ which energizes the relay $504_1$ to close the contact $503_1$. The signals transmitted by the generator 510 pass into the line $12_1$ and actuate the bell 408 of the subscriber's set 1 (FIG. 1).

When the multiregister 2104 gives the order for the end of the call, the same arrives at the flip-flop $505_1$ over the wire $2104_{12}$. The flip-flop $505_1$ returns to zero condition, the energizing current in the relay $504_1$ stops and the contact $503_1$ cuts the call current coming from the generator 510.

The secondary windings of the transformers $501_1$ to $501_n$ have each a center point. All these points are connected to −48 v. of the exchange battery for supplying the sets of the subscribers.

The coded call signals coming from the transformers $51_1$ to $51_n$ pass are applied, in the same way as the coded speech signals, to the pulse converters $200_1$ to $200_n$ of the converter stage 20 which are connected respectively to the inputs of the send sampling matrix 2101 (FIG. 3) of the switching network 21.

The retransmission units $2000_1$ to $2000_n$ are connected respectively to the outputs of the receive sampling matrix 2102 (FIG. 3) but have nothing to do with the call.

In the following it will be assumed that the multiplex highway of the time-division switching network on which the speech signals of the subscribers are multiplexed in time, is a two-wire line. It follows therefrom that the speech signals from the caller to the called and the speech signals from the called to the calling subscriber must be dealt with at two different instants $t'_i$ and $t''_i$ which form the time channel $t_i$.

The address register 2103 of the switching network 21 contains the addresses of the callers and of the called parties supplied by the multiregister 2104. At the moment $t'_i$, the caller's address controls the send sampling matrix 2101 and the address of the called party controls the receive sampling matrix 2102. At the moment $t''_i$, the address of the caller controls the matrix 2102, and the address of the called party controls the matrix 2101. The information moves on the highway 2100 from the matrix 2101 to the matrix 2102.

The call number, which is an information supplied by the caller, is therefore sampled and is available on the highway 2100 at the moments $t'_i$. The information present at the moments $t'_i$ on the highway 2100 will be called in the following $S_i$; it may be a call number information or not. It is only at the instants $t'_i$ that the information of the multiplex highway has access to the call number analyzer 60.

Let us assume that the call number analyzer is designed for dealing with eight simultaneous calls; then it has to be connected sequentially to eight time-slots, the connection to a given time channel lasting a sufficiently long time to detect the absence of signal which announces a call number. A period of 10 ms. without any pulse corresponds to 560 zero pulses at a frequency of 56 kHz. It will be assumed that in a eight-slot multiplex analysis, it is necessary to recognize 32 successive zero pulses for being sure that the following pulses relate to a call number. Thus each time channel $t_i$ is to be connected to analyzer 60 during a time $T_i$ $$T_i=32/56000=570\ \mu s.$$

Each time-slot is therefore scanned every (8×570)=4.56 ms. Since, as already mentioned, the absence of the line signal which precedes any call number lasts for 10 ms., it is certain that analyzer 60 in its multiplex scanning detects this absence at least twice.

When the subscriber A lifts his handset, the multiregister 2104 of the switching network 21 allots to the subscriber A a time-slot, for example the slot $t_2$, with the effect that the flip-flop $\mathbf{2105_2}$ is set at one. The flip-flop $\mathbf{2105_2}$ produces a signal which is applied to the AND gate 222. This receives from the time base generator 22 a signal $T_2$ and a signal $t'_2$. As already mentioned, the signal $T_2$ lasts for 570 μs. and has a recurrence period of 4.56 ms.; this is the time during which the analyzer 60 is connected to the time-slot $t_2$.

The AND gate 222 passes the signal $t'_2$ coming from the time base generator 22. This signal $t'_2$ is the pulse defining the time-slot $t_2$. After passing through the OR gate 229, the pulse $t'_2$ acts on the first input of the AND gate 61 of the analyzer 60. The second input of the latter receives the information from the multiplex highway 2100.

At each opening of the AND gate 61 at the periods $t'_2$, the highway signal, called $S_i=S_2$, coming from the calling subscriber A, passes to the analyzer 60 and this analyzer 60 determines whether the signal $S_2$ is a call number or not.

Figure 5:
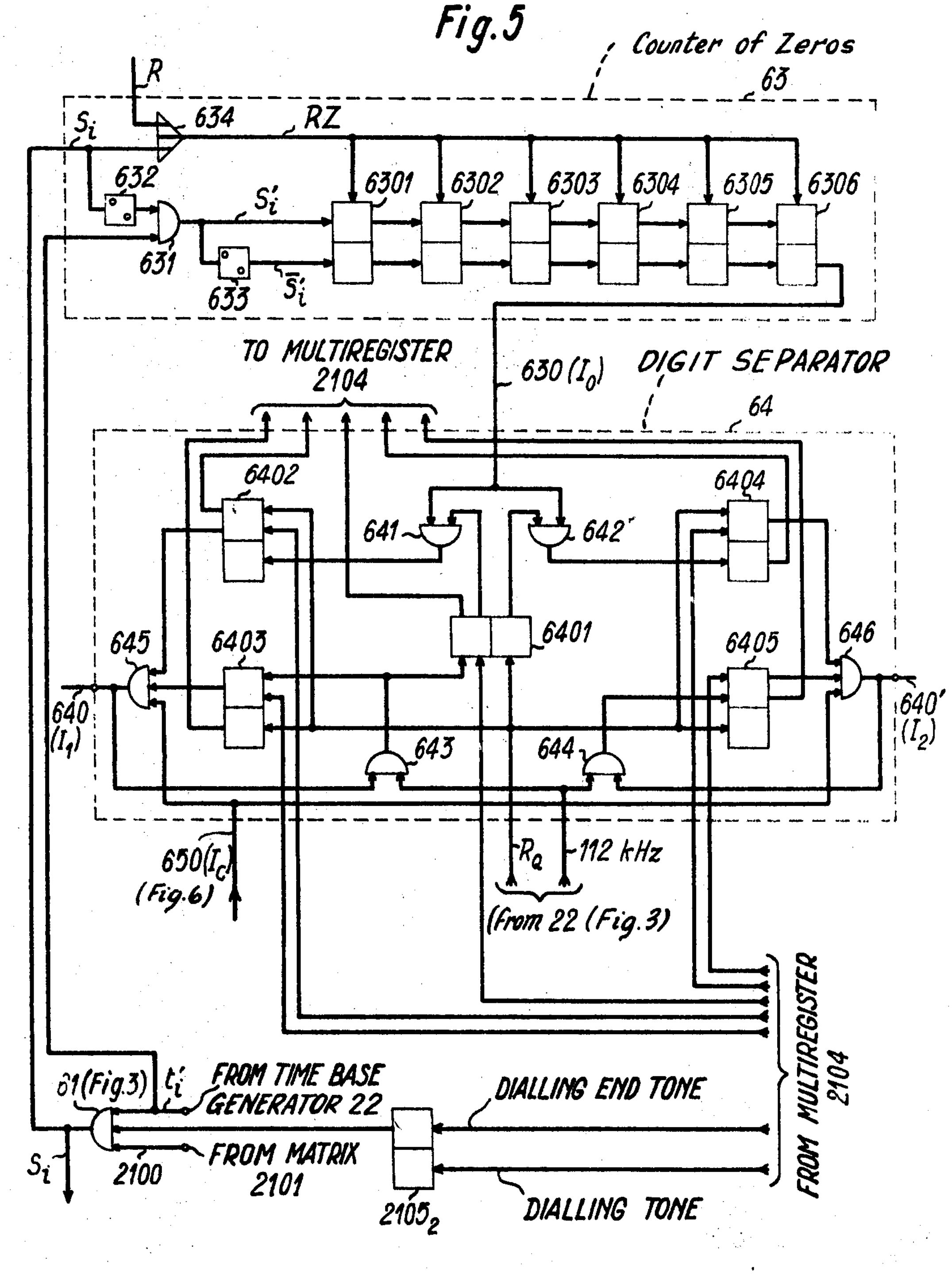
FIGS. 5 and 6 show the arrangement of the circuits used in the numbering analyzer located in the exchange.
Figure 6:
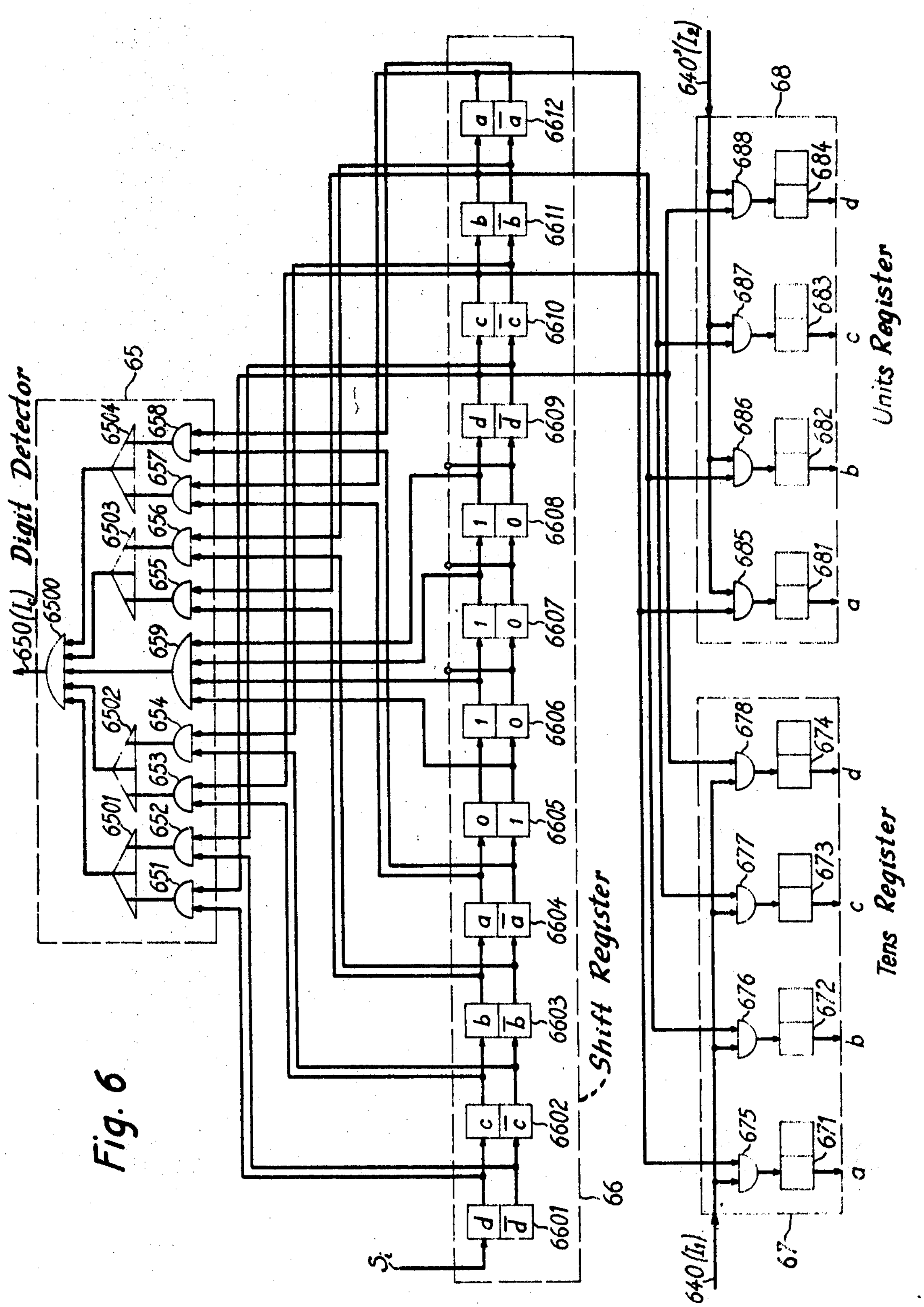
Figure 7:
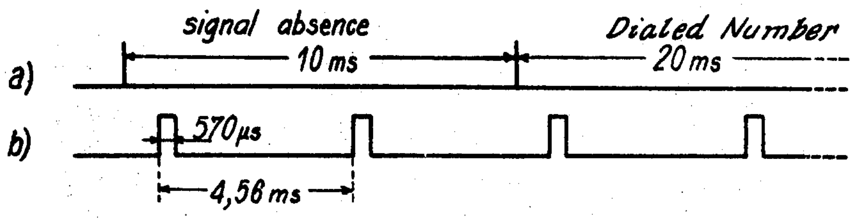
FIGS. 7, 8, 9 and 10 are signal waveform diagrams relating to the signals used in the equipment according to the invention in the telephone exchange.

To this end, the analyzer 60 carries out the following functions:

1. the detection of the absence of a line signal that is the presence of at least 32 successive zero pulses, by means of the zero counter 63 (FIGS. 3 and 5);
2. reception of the binary coded decimal digits of a call number, by means of the shift register 66 (FIGS. 3 and 6);
3. the separation of the first and second decimals digits of the call number by means of the digit separator 64 (FIGS. 3 and 5);
4. the recording of the transmitted digits in the tens and units registers 67 and 68 (FIGS. 3 and 6).

The signal $S_2$ on the multiplex highway 2100, coming from the AND gate 61 at the times $t'_2$ is applied simultaneously to the zero counter 63 and the shift register 66 (FIGS. 5 and 6).

Figure 8:
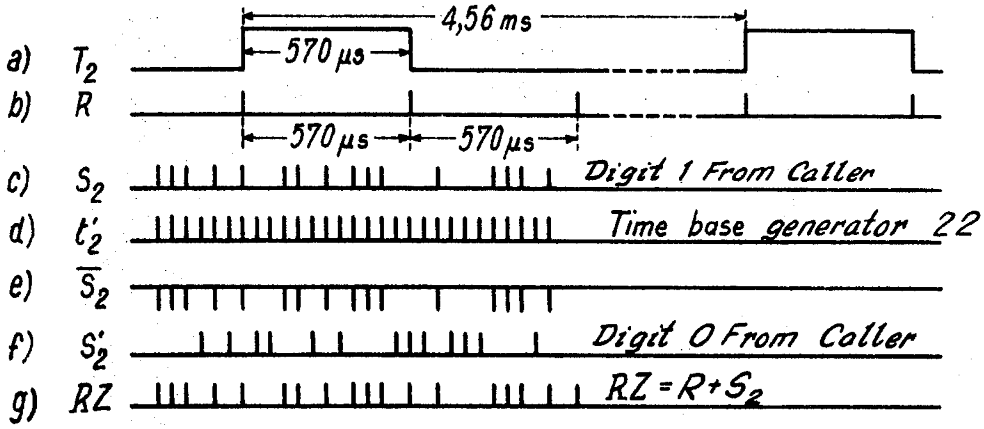

The zeros can be extracted from this information by comparing the signals $S_2$ and $t'_2$. To this end, the signal $S_2$ is reversed by the inverter 632 (FIG. 5) and the complementary signal $\overline{S}_2$ is applied to one of the inputs of the AND gate 631. The second input of this gate receives the signal $t'_2$. The signal $S'_2$ at the output of the AND gate 61 corresponds to the zeros of the call information. The diagrams (*c*), (*e*) and (*f*) in FIG. 8 shows how the signal $S'_2$ is obtained from the signal $\underline{S_2}$.

The signal $S'_2$ and its complementary $\overline{S'}_2$, obtained by means of the inverter 633, are applied to the inputs of a counter formed by a chain of six flip-flops 6301 to 6306 which counts the zeros of the signal $S_2$ which follow each other in the call information during the time interval $T_2=570\ \mu s$. When the sixth flip-flop 6306 changes its state, 32 successive zeros have occurred within the same time $$T_2=570\ \mu s=32/56000\ s.$$

A pulse signal R, corresponding to the leading front of each interval $T_1$ to $T_8$ and coming from the time base generator 22, is applied at the same time as the signal $S_2$ to one of the inputs of the OR gate 634 and produces a reset signal RZ (FIG. 8 line *g*) which systematically resets the counter 63.

The signal $I_o$, coming from the counter 63, indicates the transmission of a binary coded decimal call digit (*a*, *b*, *c*, *d*). It is applied to the shift register 66 for recording this call digit and to the programmer 64 for producing a time separation between the first and second digits of the call number.

The recognition of a digit of the call number is effected by the shift register 66 which comprises 12 flip-flops 6601 to 6612 (FIGS. 3 and 6). This register cooperates with the digit detector which is an assembly of AND and OR gates 65 (FIGS. 3 and 6).

The transmitted call digit which, as already mentioned, has the shaped *a b c d* 1 1 1 0 *a b c d* 1 1 1 0 . . . advances in the register at the rhythm of the clock 23 at the frequency of 56 kHz.

When a call digit *a b c d* is present in the register 66, the following occurs:

The binary digit *d* and its complementary $\bar{d}$ appear at the respective outputs of the flip-flops 6601 and 6609, which open one of the AND gates 651 or 652;

The binary digit *c* and its complementary $\bar{c}$ appear at the outputs of the flip-flops 6602 and 6610 which open one of the AND gates 653 or 654;

The binary digit *b* and its complementary $\bar{b}$ appear at the outputs of the flip-flops 6603 and 6611, which open one of the AND gates 655 or 656;

The binary digit *a* and its complementary $\bar{a}$ appear at the outputs of the flip-flops 6604 and 6612, which open one of the AND gates 657 or 658;

The binary digits 1 1 1 0 of the framing sequence must appear at the corresponding outputs of the flip-flops 6608, 6607, 6606, 6605. By connecting the inputs of the AND gate 659 to the zero output of the flip-flop 6605 and to the one outputs of flip-flops 6606, 6607, 6608, the gate is opened when the bits of the framing sequence are in the proper flip-flops of the shift register 66.

The outputs of the AND gates 651 to 659 are connected to the inputs of the AND gate 6500 either directly or through OR gates 6501 to 6504 and, since the call digit is stored in the register 66, this AND gate 6500 passes a signal $I_c$. The width of the signal $I_c$ is equal to a half-period of the clock (56 kHz.).

The first and second digits are separated by means of a digit separator 64 (FIGS. 1 and 5) which receives the signal $I_o$ transmitted by the counter 63 over the wire 630 and which announces the arrival of a coded call digit (*a*, *b*, *c*, *d*) and the signal $I_c$ emitted by the digit detector 65 over the wire 650, announcing the recording of the coded call digit.

The first binary coded decimal digit is received after a first detection of the absence of signal, equivalent to 32 clock periods.

The second coded digit is not received unless the first digit is recorded and unless it is detected by way of a new absence of signal.

The separation treatment of the decimal digits of the call number is implemented by the flip-flops 6401 to 6405 of the digit separator 64. Since this treatment is effected over several periods $T_i$ for one and the same time-slot $t_i$, the information received by the flip-flops 6401 to 6405 is stored in the multiregister 2104 between two periods $T_i$.

At the start of each period $T_i$ the following operation takes place:

- the transfer of the content of the flip-flops 6401 to 6405 to the multiregister 2104. This content affects the time-slot $t_{(i-1)}$;
- the reset of the flip-flops 6401 to 6405;
- the positioning of the flip-flops 6401 to 6405 by the multiregister 2104. From this moment, the contents of the flip-flops affect the time-slot $t_i$.

These three operations are controlled by three signals $R_T$, $R_Q$, $R_P$ (FIG. 9), supplies by the time base generator 22. These signals are repeated every 570 μs. The signals $R_T$ and RP (lines *c* and *e* in FIG. 9) act on the multiregister 2104. The signal $R_Q$ acts on the flip-flops 6401 to 6405.

Figure 9:
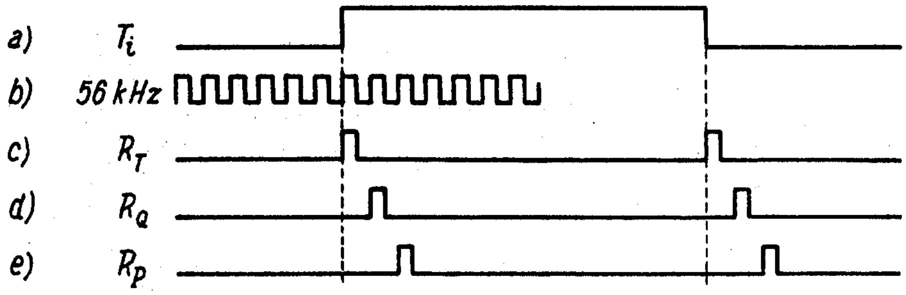

FIG. 9 shows the position of these signals as a function of the time.

It should be mentioned that the time necessary for these operations does in no way affect the operation of the analyzer 60. The first information capable of affecting the flip-flops 6401 to 6405 cannot arrive until after the register 66 has been filled which requires a time equal to 12 periods with a frequency of 56 kHz.

The first absence of signal, confirmed by the appearance of the signal $I_0$ coming from the zero counter 63, causes the flip-flop 6402 of the digit separator 64 to change over. The AND gate 645 is open and the signal $I_c$ coming from the digit detector 65 passes through this gate to give the transfer impulse $I_1$.

Figure 10:
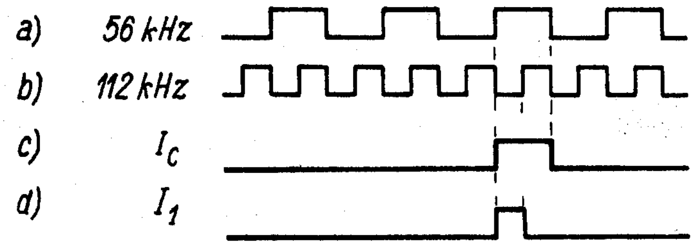

The first effect of this pulse $I_1$ is to change the state of the flip-flops 6401 and 6403 by the AND gate 643 and consequently to close the AND gate 645, and to cutoff the transfer pulse $I_1$. Without any delay in the loop from the output to the input of gate 645, this pulse would have a duration equal to the duration of the changeover of the flip-flop 6403. A delay is obtained by applying to the AND gate 643 pulses to a frequency of 112 kHz., supplied by the time base generator 22. The signal $I_c$ is in phase with the 56 kHz. signal transmitted by the clock 23 and lasts for a half-period of the signal at 56 kHz., i.e. for a period of the signal at 112 kHz. (FIG. 10).

The transfer pulse $I_1$ prepares the opening of the AND gate 643, the first leading front of the 112 kHz. signal arrives 4.6 $\mu$s. afterwards, changes the state of the flip-flops 6401 and 6403 and closes therefore the AND gate 645. The transfer pulse $I_1$ is therefore interrupted but has lasted for 4.6 $\mu$s.

After this pulse $I_1$ has been obtained, any new passage of the signal $I_c$ across the AND gate 645 is impossible. The pulse $I_1$ is therefore unique and characterizes well the first transmitted binary coded decimal digit, i.e. the tens digit of the call number.

Since the flip-flop 6401 has changed state at the same time as the flip-flop 6403, the next detection of signal absence is confirmed by the appearance of the signal $I_0$ at one of the inputs of the AND gate 642. The state of the flip-flop 6404 is changed which indicates that the first digit has been detected and the second is being processed. The changeover of the flip-flop 6404 opens the AND gate 646 which passes the new pulse $I_c$ to form the second transfer pulse $I_2$. This pulse causes the state of the flip-flop 6405 to change by way of the AND gate 644 being opened by the transfer pulse $I_2$ and the 112 kHz. pulse signal. The AND gate 646 is then closed.

Finally, the transfer pulses $I_1$ and $I_2$ are unique and the digit separator 64 cannot detect a new number analysis until a general resetting by the multiregister 2104.

The signals $I_1$ and $I_2$ control respectively through the wires 640 and 640', register 67 and 68 of identical construction.

The tens register 67 for example comprises four flip-flops 671 to 674. Each input of these flip-flops is connected to the output of an AND gate 675 to 678. The first inputs of these gates are connected to the wire 640 which transmits the transfer signal $I_1$. The second inputs of these gates are connected respectively to corresponding outputs of flip-flops 6612, 6611, 6610, 6609 of the register 66 in which appear the bits *a*, *b*, *c*, *d* of the first binary coded decimal call digit. The application of the transfer pulse $I_1$ causes the bits *a*, *b*, *c*, *d* to leave the register 66 and to transfer to the ten register 67.

In the store 68, the AND gates 685 to 688 are connected to the same flip-flops 6612, 6611, 6610, 6609 of the register 66 and the pulse $I_2$ is applied to the second inputs of the AND gates 685 to 688. When these AND gates are open, the bits *a*, *b*, *c*, *d* of the units digit of the call number is transferred into the units register 68.

The register 67 and 68 are emptied into the multiregister 2104 by a transfer signal such as $R_T$, which has been mentioned above.

When the multiregister 2104 has received the coded call digits of the called subscriber, it transmits a signal which, as already mentioned, switches the flip-flop $505_2$ allotted in the unit 50 to this called subscriber (FIG. 4).

The flip-flop $505_2$ actuates the relay $504_2$, whose contact connects the line $12_2$ through the transformer $502_2$ to the ringing tone generator 510. This generator actuates the bell 408 in the set of the called subscriber.

Moreover, the multiregister 2104 resets the flip-flop $2105_2$ with the effect of closing the analyzer 60 to the signal of the multiplex highway 2100, corresponding to the time-slot $t_2$. When the multiregister 2104 detects the lifting of the called subscriber's receiver, the sampling of the two parties is assured by means of the address register 2103, to which the multiregister 2104 has passed the address of the called subscriber.

In FIG. 2 the coded combinations of the call number are obtained by means of a shift register with eight stages looped back on itself. The eight stages are positioned by the depression of the key of the keyboard wherein four of these stages are fixed and the other variable to one or zero according to the number of the depressed key. Depression of a key of the keyboard causes the register to advance after having positioned the fixed and variable bits and the register supplies the binary coded decimal digit marked on the key and the fixed framing combinations.

Figure 11:
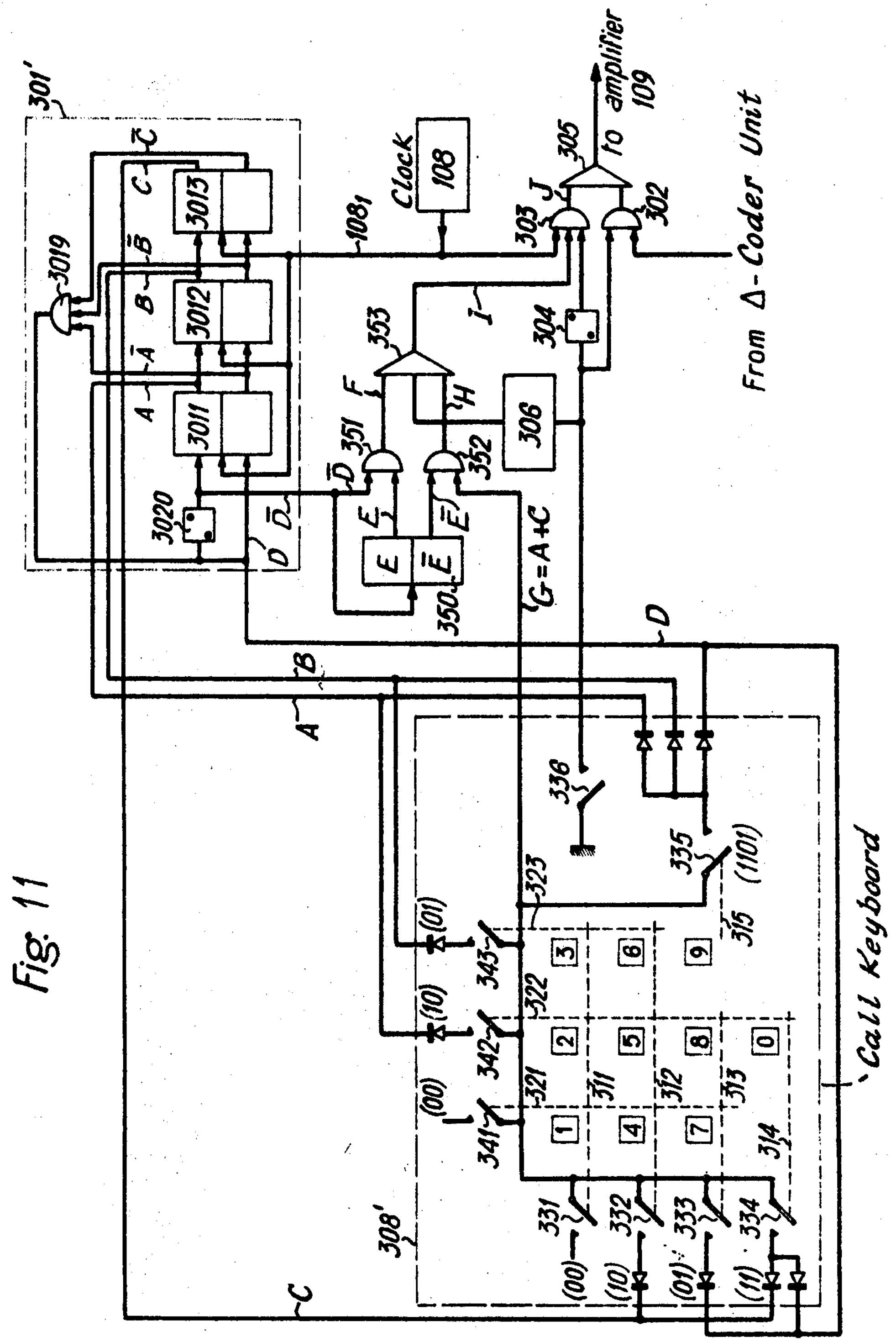
FIG. 11 is a detailed diagram of an embodiment of a call unit in a telephone set.

In FIG. 11, the shift register 301' comprises only three stages. It is looped back on itself by an AND gate 3019 and carries a fixed information. It is this information selected from different points of the register according to the key of the keyboard which has been actuated which supplies the main bar across the key contacts and the information applied to the main bar of the keyboard serves to elaborate gating pulses to pass or to prevent the passage of the clock pulses which form the code of the decimal digit corresponding to the actuated key.

In FIG. 11, 308' represents the call keyboard. Its mechanical parts, keys, bars and switches do not differ from those of FIG. 2 and bear the same reference numerals.

The coding of the digits 0 to 8 is effected by identifying each bar by two binary digits. The bar corresponding to digit 9 is identified by four binary elements.

These identifications are shown in the following table:

| Bar | Associated switch | Binary identification digits |
|---|---|---|
| 311 | 331 | 0 0 |
| 312 | 332 | 1 0 |
| 313 | 333 | 0 1 |
| 314 | 334 | 1 1 |
| 315 | 335 | 1 1 0 1 |
| 321 | 341 | 0 0 |
| 322 | 342 | 1 0 |
| 323 | 343 | 0 1 |

The coding of the keys is as follows:

| | | |
|---|---|---|
| 1→0 0 0 0 | 2→1 0 0 0 | 3→0 1 0 0 |
| 4→0 0 1 0 | 5→1 0 1 0 | 6→0 1 1 0 |
| 7→0 0 0 1 | 8→1 0 0 1 | 9→1 1 0 1 |
| | 0→1 0 1 1 | |

It should be noted that, compared with the keyboard of FIG. 2 which does not use the combination 0 0 0 0, the new organization avoids the combination 1 1 1 1. The fixed sequence chosen is the same as that in FIG. 2, namely 1 1 1 0.

The code transmitted in line for each digit of the keyboard is the following:

1–1 1 1 0 0 0 0 0 1 1 1 0 0 0 0 0
2–1 1 1 0 1 0 0 0 1 1 1 0 1 0 0 0
3–1 1 1 0 0 1 0 0 1 1 1 0 0 1 0 0
4–1 1 1 0 0 0 1 0 1 1 1 0 0 0 1 0
5–1 1 1 0 1 0 1 0 1 1 1 0 1 0 1 0
6–1 1 1 0 0 1 1 0 1 1 1 0 0 0 1 1
7–1 1 1 0 0 0 0 1 1 1 1 0 0 0 0 0
8–1 1 1 0 1 0 0 1 1 1 1 0 0 1 0 0
9–1 1 1 0 1 1 0 1 1 1 1 0 0 1 1 0
0–1 1 1 0 1 0 1 1 1 1 1 0 0 1 0 1

Depression of a key of the keyboard actuates the main switch 336 which connects a ground potential to the AND gate 302 and a battery potential to the AND gate 303, owing to the presence of the inverter 304. The gate 302 is therefore closed. Moreover, the monostable flip-flop 306, actuated by the main switch 336, applies through the OR gate 353 during 10 ms. a signal to the AND gate 303. The gate 303 is opened and passes for these 10 ms. the pulses of the clock 108 (FIG. 2) through the AND gate 303 and the OR gate towards the amplifier 109. Contrary to the keyboard of FIG. 2, in which the signal preceding the call number was a sequence of zero digits during 10 ms., this signal is, in FIG. 11, a sequence of one digits lasting the same time.

At the end of this identification time interval, the cyclic binary coded decimal digit is transmitted under the combined action of the keyboard 308', the shift register 301' and a set of gates.

The shift register 301' does no longer comprise eight flip-flops as in the case of the register 301 in FIG. 2, but only three flip-flops 3011, 3012, 3013. These supply, respectively, the signals A, B, C (diagram A, B, C in FIG. 12). The negations of these signals are applied to the inputs of the AND gate 3019, the output of which yields the signal $D=\bar{A}.\bar{B}.\bar{C}$ (diagram in line D of FIG. 12) which is applied directly or by means of the inverter 3020 to the inputs of the flip-flop 3011. The signals D and $\bar{D}$ progress in the register at the rhythm of the clock 108.

The shift register 301' is controlled by the clock and its flip-flops supply pulses of a duration double that of the clock which are adjacent and spaced in time. Three of these pulses A, B, C are taken from the flip-flops and the fourth D from the negated output of the AND gate 3019 located in the loop of the shift register. These signals A, B, C, D are applied to the main bar of the keyboard by the contacts of the keyboard.

It can be seen from FIG. 11 that the main bar is unconnected when the key 1 is depressed, and when the keys 2 to 0 are depressed, the signal G on the main bar is as follows:

| | |
|---|---|
| 2 | $G=A$ |
| 3 | $G=B$ |
| 4 | $G=C$ |
| 5 | $G=A+C$ |
| 6 | $G=B+C$ |
| 7 | $G=D$ |
| 8 | $G=A+D$ |
| 9 | $G=A+B+D$ |
| 0 | $G=C+D$ |

It can be seen that the groups of diodes located on certain contacts of the keyboard may be regarded as OR gates. In the example given in the description it has been supposed that the key 5 of the keyboard has been depressed.

The signal $\bar{D}$ is also used in the flip-flop 350 which forms a signal E (diagram E in FIG. 12), the duration of which is equal to its half-period.

Figure 12:
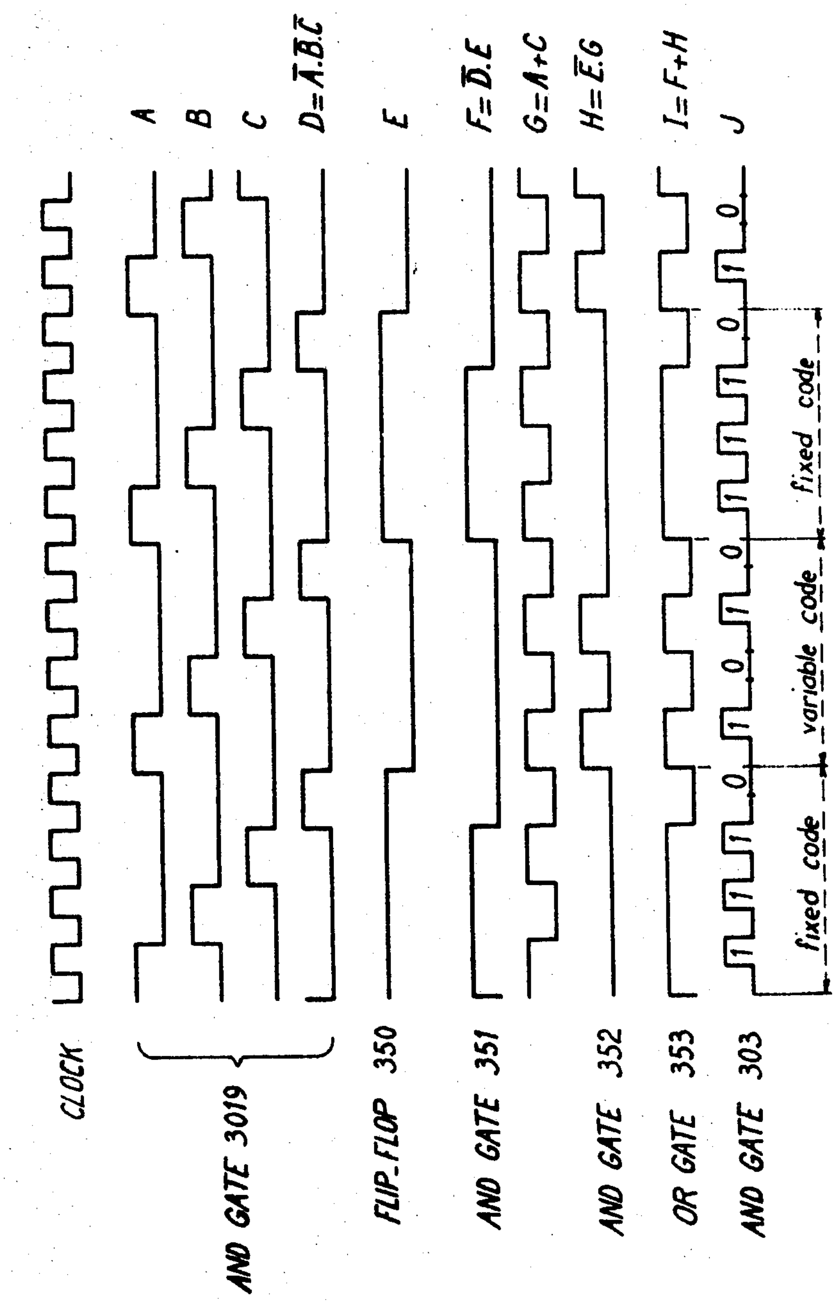
FIG. 12 shows diagrams relating to the signals used in the telephone set of FIG. 11 for forming the call signals transmitted to the telephone exchange.

The AND gate 351, the inputs of which receive the signals $\bar{D}$ and E gives at its output the signal $F=\bar{D}.E$ (diagram F in FIG. 12).

The AND gate 352, the inputs of which receive the signals $\bar{E}$ and G, wherein G is the signal obtained by actuating one key of the keyboard 308, gives at its output a signal $H=\bar{E}.G$ (diagram H in FIG. 12).

The signals F and H alternate at the inputs of the OR gate 353 (diagram I in FIG. 12) and consequently at one of the inputs of the AND gate 303.

The call signals obtained in this manner are processed in the exchange in the same way as has been described above.

What we claim is:

1. A call transmission system for a time-division Δ-code switching system comprising subscriber's telephone sets each including a Δ-coder unit for converting incoming Δ-code pulses into speech signals, a clock pulse generator, means for synchronizing said clock pulse generator by said incoming Δ-code pulses, means for synchronizing said Δ-coder unit by said clock pulse generator, a keyboard arrangement for generating variable call pulse combinations coded in a binary code, fixed pulse combinations framing said variable call pulse combinations and a predetermined number of pulses of a given polarity forming a group for identifying a call pulse combination, the bits of the said call pulse combinations and framing pulse combinations and the bits of said identifying group having the same frequency as the Δ-code pulses, and a time-division switching network including a clock pulse generator, subscribers' equipments each comprising a pulse stretcher circuit for stretching the Δ-code pulses the pulses of the call pulse combinations and framing pulse combinations and the pulses of the identifying group received from the telephone set, a phase-shifter circuit for bringing the stretched pulses into phase concordance with the switching network clock pulse generator and a sampler for sampling the stretched and phase-shifted pulses in time slots respectively allotted to the subscribers, a call number register for receiving the call pulses combinations and the framing pulses combinations, call digit registers for receiving the call pulse combinations, a counter circuit for counting said pulses of a given polarity and a switching circuit controlled both by said counter circuit and call number register for directing the Δ-code pulses towards the outgoing subscriber's lines of the switching network and the variable call pulse combinations towards said call digit register.

2. A call transmission system as set forth in claim 1 in which the call number register comprises a shift register having a number of stages equal to the number of bits of the framing pulse combinations plus two times the number of bits of the call pulse combinations, call number registers and means for transferring the call pulse combinations into said call number registers when the central stages of said shift register are filled-in by the bits of the framing pulse combination and the stage sets on both sides of the shift register are both filled-in by the bits of the call pulse combination.

3. A call transmission system as set forth in claim 1 in which the keyboard arrangement for generating variable call pulse combinations provided in each telephone set comprises a keyboard having ten outputs, a shift register having variable stages the inputs of which are respectively connected to the keyboard outputs for writing therein the call pulse combinations and fixed stages having written therein the framing pulse combinations, and switching means controlled by said keyboard for selectively connecting the subscriber's line of said telephone set to the Δ-coder unit and to the shift register output.